(12) United States Patent
Bertin

(10) Patent No.: US 11,079,291 B2
(45) Date of Patent: Aug. 3, 2021

(54) INDUCTIVE POSITION SENSOR

(71) Applicant: SEMICONDUCTOR COMPONENTS INDUSTRIES, LLC, Phoenix, AZ (US)

(72) Inventor: Jacques Jean Bertin, Pocatello, ID (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 244 days.

(21) Appl. No.: 15/949,762

(22) Filed: Apr. 10, 2018

(65) Prior Publication Data

US 2019/0310148 A1 Oct. 10, 2019

(51) Int. Cl.
*G01L 3/10* (2006.01)
*G01D 5/20* (2006.01)

(52) U.S. Cl.
CPC .............. *G01L 3/105* (2013.01); *G01D 5/208* (2013.01); *G01D 5/2093* (2013.01)

(58) Field of Classification Search
CPC ....................................................... G01L 3/105
See application file for complete search history.

(56) References Cited

U.S. PATENT DOCUMENTS

| | | | | |
|---|---|---|---|---|
| 6,384,598 B1* | 5/2002 | Hobein | ................ | G01D 5/2046 318/654 |
| 8,453,518 B2* | 6/2013 | Diekmann | .............. | G01L 5/221 73/862.08 |
| 9,528,858 B2 | 12/2016 | Bertin | | |
| 10,444,037 B2* | 10/2019 | Bertin | ................. | G01D 5/2093 |
| 2006/0066167 A1 | 3/2006 | Saito | | |
| 2006/0233123 A1 | 10/2006 | Lee | | |
| 2009/0133867 A1 | 5/2009 | Kuckes | | |
| 2010/0319467 A1 | 12/2010 | Diekmann et al. | | |
| 2014/0055000 A1 | 2/2014 | Adra | | |
| 2016/0273945 A1 | 9/2016 | Olsak | | |
| 2017/0166251 A1 | 6/2017 | Shao et al. | | |

(Continued)

OTHER PUBLICATIONS

Jacques Jean Bertin, "Inductive Position Sensor", U.S. Appl. No. 16/561,390, filed Sep. 5, 2019.

(Continued)

*Primary Examiner* — Leslie J Evanisko
*Assistant Examiner* — Leo T Hinze
(74) *Attorney, Agent, or Firm* — Wash Park IP Ltd.; John T. Kennedy

(57) ABSTRACT

Systems, devices, and methods for determining a torque on a target using an inductive torque sensor are described. The inductive torque sensor may include an excitation coil, two rotors, and two or more receive coils. Each of the receive coils and the rotors may be inductively coupled. The two or more receive coils may be configured to generate a received voltage which can be approximated by a sine waveform function based on the angular changes of the coils on each rotor, the distance of the receive coils from the rotors and the distance between the receive coils. An integrated circuit may be configured to determine the torque generated on the target based on calculated differences between the angular rotation of the first rotor versus the second rotor over a given period.

20 Claims, 11 Drawing Sheets

(56) References Cited

U.S. PATENT DOCUMENTS

2019/0072414 A1    3/2019   Utermoehlen
2019/0097501 A1    3/2019   Lin et al.

OTHER PUBLICATIONS

U.S. Appl. No. 15/802,000, Notice of Allowability dated Jun. 12, 2019.
U.S. Appl. No. 15/802,000, filed Nov. 2, 2017.
U.S. Appl. No. 16/112,221, filed Aug. 24, 2018.
U.S. Appl. No. 16/561,390, filed Sep. 5, 2019.
U.S. Appl. No. 16/112,221, Response to non-final Office Action, dated Apr. 17, 2020.
U.S. Appl. No. 16/112,221, Examiner Email and Applicant Response, respectively dated Jun. 30, 2020 and Jul. 8, 2020.
CN Application Serial No. 201910727721.5, Application filed Aug. 8, 2019.
U.S. Appl. No. 16/112,221, non-final Office Action, dated Jul. 21, 2020.
U.S. Appl. No. 16/112,221, Resposne to non-final Office Action, dated Oct. 12, 2020.
U.S. Appl. No. 16/112,221, Non-final Office Action, dated Jan. 21, 2021.
U.S. Appl. No. 16/561,390, Non-final Office Action, dated May 7, 2021.
U.S. Appl. No. 16/112,221, Response to Non-final Office Action, dated Apr. 9, 2021.

\* cited by examiner

INDUCTIVE POSITION SENSOR

TECHNICAL FIELD

The technology described herein generally relates to devices, systems, and methods for determining the torque exerted onto an object. More specifically, the technology described herein generally relates to electronic devices, systems, and methods which utilize electromagnetic principles, such as inductance, to determine the torque exerted on an object.

BACKGROUND

Torque sensing devices, including inductive torque sensors, are widely used today. Various uses include, but are not limited to, automobiles and other vehicles, factory settings, and otherwise. Inductive torque sensors are used to determine the torque exerted on an object, such as steering wheel, an axle or other drive train component thereof, a rotating assembly, such as a flywheel, or otherwise, hereafter defined as a "target." Today, inductive torque sensors typically include an excitation coil configured to generate an electromagnetic field when electrical current flows through the coil, two or more receiving coils configured to detect an electrical potential, a voltage, induced in the receiving coil by the currents flowing through the excitation coil, and two rotors.

Rotors are configured to disturb the amount of electrical potential induced in each of the receiving coils based on each rotor's position. The rotors are typically attached, directly or indirectly, to first and second members of the target such that as the target rotates, torques can be detected thereon based on each rotor's relative position at a given time. To detect torques, often a target includes a torsion bar or element disposed between and connecting first and second members of the target. The torsion bar is commonly configured to reflect a torque exerted on the target and can be measured, using principles of inductive coupling, based on the relative position of the two rotors attached to the respective first and second members. Such changes in the position of the rotors, in turn, uniquely disturb the voltages induced in the receiving coils such that the position of the rotors can be determined based on the changes in the electrical potential induced in the receiving coils. In short, rotors can be defined to affect the inductive coupling between the excitation coil and each receiving coil by mathematical functions (each a "transfer function").

Commonly, inductive torque sensors utilize two absolute position sensors configured to measure the angular positions of each rotor and calculate the angular differences to determine the torque exerted on the target. These measurement approaches, however, often lead to substantial errors, especially in high revolutions-per-minute (RPM) applications. For example, if the target rotates at a high RPM while the torque is constant, the two rotors' angles change even though the angular difference is constant. As used herein, applications are referred to as low RPM and high RPM. A low RPM application refers to one where the rotating member rotates at less than 1,200 RPM, or 20 rotations per second. Examples of low speed RPM include, but are not limited to, automobile steering wheels, bicycle cranks, and otherwise. In contrast, a high RPM application commonly includes those involving thousands of RPM, such as electric motors where 12,000 RPMs are common, and otherwise. It is to be appreciated that the distinction between high and low RPMs is not fixed and is used for purposes of illustration and discussion only.

Accordingly, a need exists for inductive torque sensors that address these and other needs. Such needs are addressed by one or more of the embodiments of the present disclosure.

SUMMARY

The various embodiments of the present disclosure relate in general to inductive torque sensors and systems and methods for manufacturing and use thereof. In accordance with at least one embodiment of the present disclosure an inductive torque sensor includes a first rotor attached to a first member of a target, a second rotor attached to a second member of the target, and a stator, aligned relative to the first rotor and the second rotor. The stator may include at least one magnetic field excitation element, a first receiver element configured to output a first received signal (ST), and a second receiver element configured to output a second received signal (SB). A processor may be coupled to the stator and configured to receive the first received signal (ST) and the second received signal (SB) and, based on the received signals, determine a torque exerted on the target as a function of a delta angle ($\Delta\Theta$).

In accordance with at least one embodiment, an inductive torque sensor may be configured for use with a target having an axle including the first member and the second member and a torsion bar separating and mechanically connecting the first member with the second member.

In accordance with at least one embodiment, an inductive torque sensor may be configured wherein the delta angle ($\Delta\Theta$) is representative, at a given time, of a relative angular change between a change in rotational position of the first rotor ($\Theta_{RT}$) versus a change in rotational position of the second rotor ($\Theta_{RB}$).

In accordance with at least one embodiment, an inductive torque sensor may include first receiver that is approximated as a first resulting average stator. Also, second receiver may be approximated as a second resulting average stator. A known or determinable distance (D0) may exist between the first resulting average stator and the second resulting average stator. A non-fixed first distance (D1) may arise between the first resulting average stator and the first rotor. A non-fixed second distance (D2) arises between second resulting average stator and the second rotor.

In accordance with at least one embodiment, an inductive torque sensor may be configured such that a known coupling attenuation (A0) arises from the known distance (D0), and a first coupling attenuation (A1) may arise from the first distance (D1). A second coupling attenuation (A2) may arise from the second distance (D2). Each of the first received signal (ST) and the second received signal (SB) may be a function of each of A0, A1, A2, $\Theta_{RT}$, and $\Theta_{RB}$.

In accordance with at least one embodiment, an inductive torque sensor may be configured such that the first receiver and the second receiver include coils configured for use in at least one of a two-phase configuration and a three-phase configuration. The first received signal (ST) for a given phase (i) may be defined pursuant to the equation: $ST_i = A_1 * \sin(\Theta_{RT} + i*\delta) - A_0 * A_2 * \sin(\Theta_{RB} + i*\delta)$, wherein for a two-phase first receiver configuration, i=0 or 1, and $\delta$=90, and wherein for a three-phase first receiver configuration, i=0, 1 or 2, and $\delta$=120.

In accordance with at least one embodiment, an inductive torque sensor may be configured such that the second received signal (SB) for a given phase (i) of the second receiver may be defined pursuant to the equation: $SB_i = A0 * A_1 * \sin(\Theta_{RT} + i*\delta) - A_2 * \sin(\Theta_{RB} + i*\delta)$, wherein for a two-phase second receiver configuration, i=0 or 1, and δ=90; and wherein for a three-phase second receiver configuration, i=0, 1 or 2, and δ=120.

In accordance with at least one embodiment, an inductive torque sensor may be configured such that the first receiver and the second receiver are configured in the two-phase configuration, and the processor is configured to determine the delta angle (ΔΘ) pursuant to the equation:

$$\Delta\Theta = \tan^{-1}\left(\frac{[(1-A_0^2)Z]}{A_0(W+X)-(1+A_0^2)Y}\right),$$

wherein: W the sum of the square of the first received signal for each phase i; X=the sum of the square of the second received signal for each phase i; Y=the sum, for each phase i, of the first received signal multiplied by the second received signal; and for a low revolution per minute target: Z=ST0*SB1−ST1*SB0 wherein: ST0=the first received signal for an initial phase; ST1=the first received signal for the first phase; SB0=the second received signal for the initial phase; and SB1=the second received signal for a first phase.

In accordance with at least one embodiment, an inductive torque sensor may be configured such that the first receiver and the second receiver may be configured in a three-phase configuration and the processor may be configured to determine the delta angle (ΔΘ) pursuant to the equation:

$$\Delta\Theta = \tan^{-1}\left(\frac{\sqrt{3}*[(1-A_0^2)Z]}{A_0(W+X)-(1+A_0^2)Y}\right),$$

wherein: W the sum of the square of the first received signal for each phase i; X=the sum of the square of the second received signal for each phase i; Y=the sum, for each phase i, of the first received signal multiplied by the second received signal; and for a low revolution per minute target: Z equals one of ST0*SB2−ST2*SB0; ST1*SB0 −ST0*SB1; or ST2*SB1 −ST1*SB2; wherein: ST0=the first received signal for an initial phase; ST1=the first received signal for a first phase; ST2=the first received signal for a second phase; SB0=the second received signal for the initial phase; SB1=the second received signal for the first phase; and SB2=the second received signal for the second phase.

In accordance with at least one embodiment, an inductive torque sensor may be configured such that the first receiver and the second receiver may be configured in a two-phase configuration, and for a high revolution per minute target, the processor may be configured to determine the delta angle ΔΘ pursuant to the equation:

$$\Delta\Theta = \tan^{-1}\left(\frac{[(1-A_0^2)Z]}{A_0(W+X)-(1+A_0^2)Y}\right),$$

wherein: W=three times the average of the square of the first received signal over each phase i; X=three times the average of the square of the second received signal over each phase i; Y=three times the average of the first received signal time the second received signal over each phase i; and Z=the average of the first received signal for the initial phase multiplied by the second received signal for the first phase minus the average of the first received signal for the first phase multiplied by the second received signal for the initial phase.

In accordance with at least one embodiment, an inductive torque sensor may be configured such that a processor may be configured to determine the torque exerted on the target for at least one of a low revolution per minute configuration and a high revolution per minute configuration.

In accordance with at least one embodiment of the present disclosure, a method for determining a torque exerted on a target may include the operation of receiving a first received signal. For at least one embodiment, the first received signal may be induced in a first receiver coil by an excitation element of a stator and influenced by the rotational positions of each of a first rotor and a second rotor.

For at least one embodiment, a method for determining a torque exerted on a target may include the operation of receiving a second received signal, wherein the second received signal is induced in a second receiver coil by an excitation element and influenced by rotational positions of each of a first rotor and a second rotor.

For at least one embodiment, a method for determining a torque exerted on a target may include the operation of determining, based on a first received signal and a second received signal, a torque as a function of a delta angle (ΔΘ) arising in view of the relative rotational positions of each of a rotor and a second rotor.

For at least one embodiment, a method for determining a torque exerted on a target may include the operation of determining a delta angle that is representative, at a given time, of a relative angular change between a sensed change in a rotational position of a first rotor ($\Theta_{RT}$) versus a sensed change of rotational position of a second rotor ($\Theta_{RB}$).

For at least one embodiment, a method for determining a torque exerted on a target may include the operation of determining a torque exerted on a target configured in at least one of a low revolution per minute configuration and a high revolution per minute configuration.

For at least one embodiment, a method for determining a torque exerted on a target may include use of a first received signal that is a function of a first mutual inductance and a third mutual inductance. For at least one embodiment, the first mutual inductance may be a function of a first distance between a first receiver coil and the first rotor. For at least one embodiment, the third mutual inductance may be a function of a third distance between the first receiver coil and a second rotor. For at least one embodiment, a second received signal may be a function of a second mutual inductance and a fourth mutual inductance; wherein the second mutual inductance is a function of a second distance between a second receiver coil and a second rotor; and wherein the fourth mutual inductance is a function of a fourth distance between the second receiver coil and a first rotor.

For at least one embodiment, a method for determining a torque exerted on a target may include operations arising from the use of each of a first receiver coil and a second receiver coil comprising a two or more phase configuration; wherein for a two-phase configuration, the phase (i)=0 or 1, and an offset (δ)=90; wherein for a three-phase configuration, i=0, 1 or 2, and δ=120; wherein, for the given phase (i), the first received signal (STi) and the second received signal (SBi) are defined by: $STi=A_1*\sin(\Theta_{RT}+i*\delta)-A_0*A_2*\sin(\Theta_{RB}+i*\delta)$ and $SBi=A0*A_1*\sin(\Theta_{RT}+i*\delta)-A_2*\sin(\Theta_{RB}+i*\delta)$.

In accordance with at least one embodiment of the present disclosure, a stator for use in an inductive torque sensor may include at least one excitation coil, a first receiver, and a second receiver. For at least one embodiment, the first receiver may include at least two coils drawn as phased loops on a first layer and a second layer of a PCB. For at least one embodiment, the phased loops on the first layer and the second layer form a first resulting average receiving stator. For at least one embodiment, a second receiver may include at least two coils drawn as phased loops on a third layer and a fourth layer of a PCB. The phased loops of the third layer and the fourth layer may form a second resulting average receiving stator. The first resulting average receiving stator may be a fixed distance from the second resulting average receiving stator.

In accordance with at least one embodiment of the present disclosure, a stator for use in an inductive torque sensor may include each of a first layer, a second layer, a third layer and a fourth layer formed on a multi-layer PCB.

In accordance with at least one embodiment of the present disclosure, a stator for use in an inductive torque sensor may include a stator configured to receive a first received signal (ST) for a given phase (i) of a first receiver. For at least one embodiment, the first received signal (ST) may be defined by: $STi = A_1 * \sin(\Theta_{RT} + i*\delta) - A_0 * A_2 * \sin(\Theta_{RB} + i*\delta)$ wherein $\Theta_{RT}$ represents an angular change in a first rotor; and wherein $\Theta_{RB}$ represents an angular change in a second rotor. For at least one embodiment, wherein a two-phase first receiver configuration is utilized, i=0 or 1, and $\delta$=90. For at least one embodiment, wherein a three-phase first receiver configuration is utilized, i=0, 1 or 2, and $\delta$=120. For at least one embodiment, a second received signal (SB) for the given phase (i) of the second receiver may be defined by: $SBi = A0 * A_1 * \sin(\Theta_{RT} + i*\delta) - A_2 * \sin(\Theta_{RB} + i*\delta)$, wherein for the two-phase second receiver configuration, i=0 or 1, and $\delta$=90; and wherein for the three-phase second receiver configuration, i=0, 1 or 2, and $\delta$=120.

In accordance with at least one embodiment of the present disclosure, a stator is provided and configured for use in an inductive torque sensor configured to determine a torque exerted on a target based on a known torque constant K and a delta angle ($\Delta\Theta$). For at least one embodiment, the delta angle may be defined by:

$$\Delta\Theta = \tan^{-1}\left(\frac{\sin(\Theta_{RT} - \Theta_{RB})}{\cos(\Theta_{RT} - \Theta_{RB})}\right).$$

BRIEF DESCRIPTION OF THE DRAWINGS

The features, aspects, advantages, functions, modules, and components of the devices, systems and methods provided by the various embodiments of the present disclosure are further disclosed herein regarding at least one of the following descriptions and accompanying drawing figures. In the appended figures, similar components or elements of the same type may have the same reference number, such as 108, with an additional alphabetic designator, such as 108a, 108n, etc., wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments described herein are directed to devices, systems, and methods for inductively determining the torque on a target.

Figure 1:
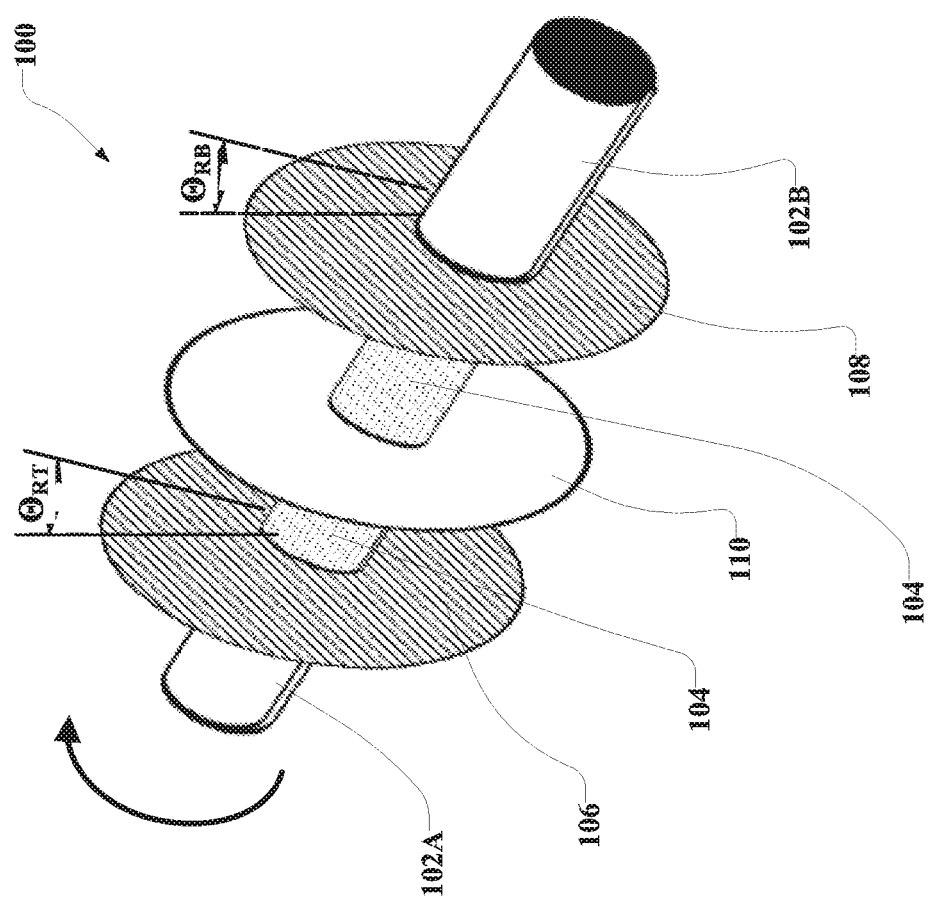
FIG. 1 is a schematic representation of a perspective view of a torque sensing assembly for use in conjunction with one or more embodiments of the present disclosure.

In accordance with at least one embodiment of the present disclosure, a torque sensing assembly 100 for determining the torque exerted on target is shown in FIG. 1. The target may include an axle having a substantially rigid first member 102A, a substantially rigid second member 102B, and a torsion bar 104 connecting the first member with the second member. The torque sensing assembly 100 includes a first/top rotor 106 and a second//bottom rotor 108 which are respectively connected to the first member 102A and the second member 102B of the target. It is to be appreciated that the "top" and "bottom" descriptors are not intended to limit the various embodiments of the present disclosure to any orientation and are used herein only for purposes of identification. The torque sensing assembly 100 also includes a stator 110. In accordance with at least one embodiment, the stator 110 may be positioned between the first/top rotor 106 and the second/bottom rotor 108. In accordance with at least one other embodiment, the stator 110 may be positioned to either side of the first rotor 106 or the second rotor 108. A stator sensor interface and integrated circuit (not shown) are included in the torque sensing assembly 100. As the axle 102A-102B rotates, the torsion bar 104 reflects the torque applied to the axle by the relative angular change in either the first member 102A or the second member 102B, as respectively represented by $\Theta_{RT}$ (the first/top rotor angular change) and $\Theta_{RB}$ (the second/bottom rotor angular change). It is to be appreciated that the angular changes may both occur, at a given time, in either a clockwise or counter-clockwise direction. For purposes of this discussion, clockwise changes are reflected in the mathematical equations discussed below. A person having ordinary skill in the art will appreciate that the signs (positive or negative) will appropriately be reversed for counter-clockwise changes in $\Theta_{RT}$ and $\Theta_{RB}$. In accordance with at least one embodiment, and as expressed by Equation 1 below, the torque exerted on the axle at a given time is a function of the angular difference, the delta angle $\Delta\Theta$, between the rotational change $\Theta_{RT}$ in the first rotor versus the rotational change $\Theta_{RB}$ of the second rotor multiplied by a known torque constant K for the torsion bar 104.

$$\tau = K^* \Delta\theta = K^*(\Theta_{RT} - \Theta_{RB}) \quad \text{Equation 1}$$

Figure 2A:
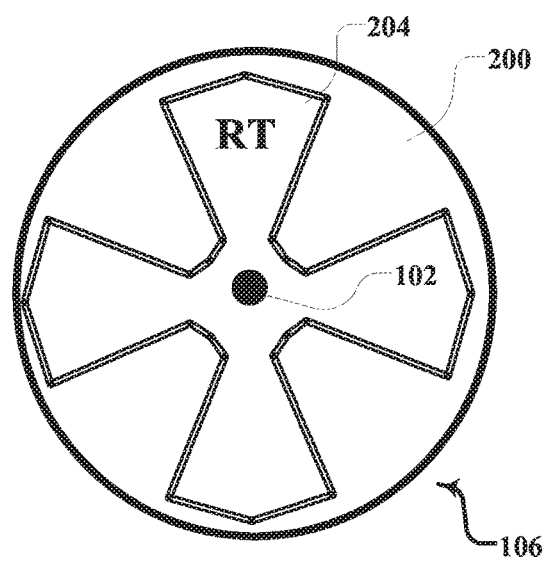
FIG. 2A is a schematic representation of a first rotor "R1" for use in accordance with at least one embodiment of the present disclosure.
Figure 2B:
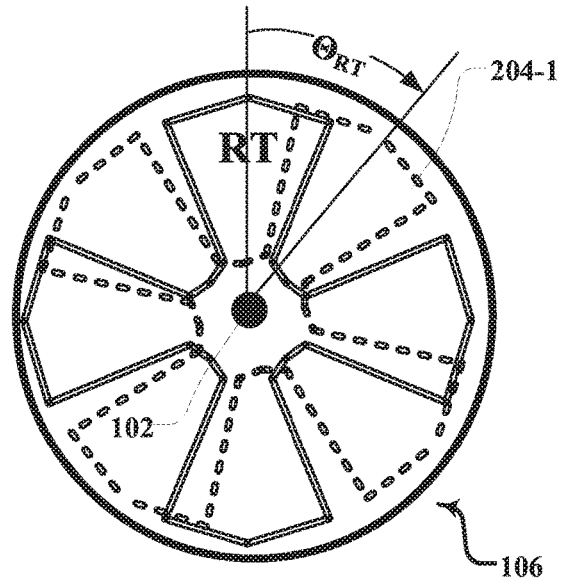
FIG. 2B is a schematic representation of the first rotor R1 that has rotated $\Theta_{RT}$ degrees in accordance with at least one embodiment of the present disclosure.
Figure 2C:
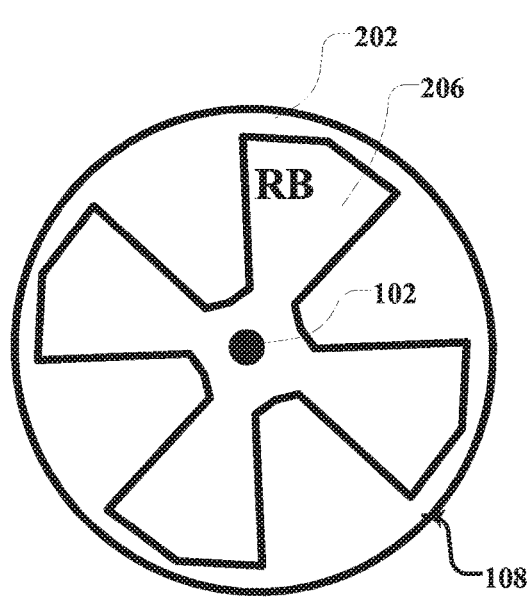
FIG. 2C is a schematic representation of a second rotor "R2" for use in accordance with at least one embodiment of the present disclosure.
Figure 2D:
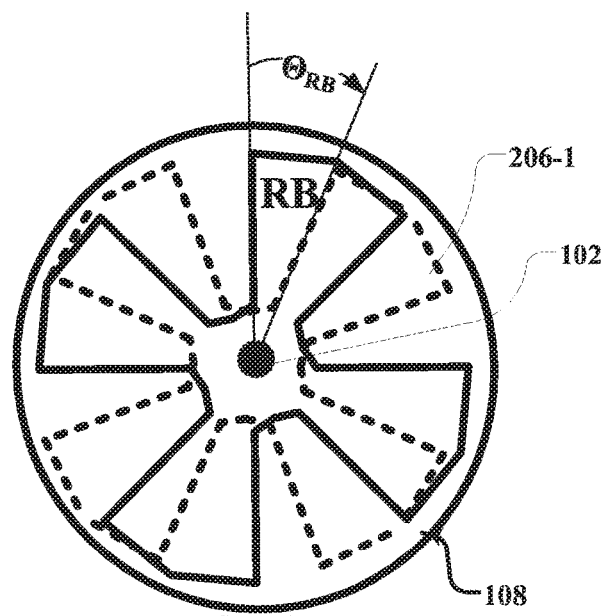
FIG. 2D is a schematic representation of the second rotor R2 that has rotated $\Theta_{RB}$ in accordance with at least one embodiment of the present disclosure.
Figure 2E:
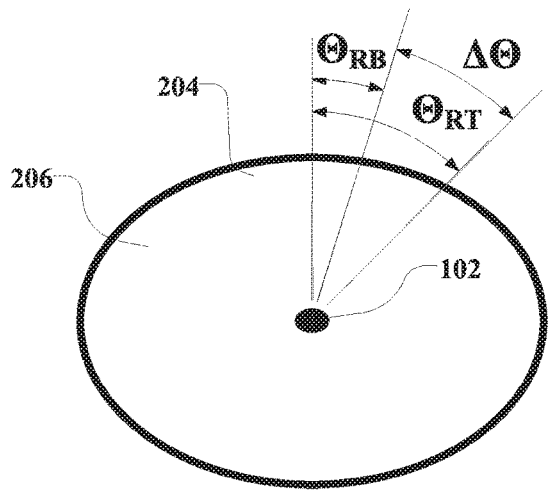
FIG. 2E is a schematic representation of the angular change $\Delta\Theta$ exerted on the first rotor R1 versus the second rotor R2, at a given instance of time, during a rotation of an axle of a target and in accordance with at least one embodiment of the present disclosure.

As shown in FIGS. 2A-2E for at least one embodiment of the present disclosure, two rotors may be used. A first/top rotor 106 "RT" and a second/bottom rotor 108 "RB" may be respectively fabricated on rotor cores 200 and 202 of any desired substance, such as a PCB or other substrate. The rotors each include a conductive material that may be configured in a coil or any other conductive shape, such as a first rotor coil 204 and a second rotor coil 206. The rotors RT and RB may be sized and configured to facilitate the detection of any desired range of rotational movements. For purposes of this disclosure only, clockwise torques are assumed and are reflected by angles $\Theta_{RT}$ and $\Theta_{RB}$. It is to be appreciated, however, that the rotors may also be torqued in a counter-clockwise direction. As the axle of the target rotates, torque may be exerted on the axle. Such torque is reflected in the difference between the angular changes in the rotors, the delta angle $\Delta\theta$. For example, and as shown in FIG. 2B, a torque applied to the axle may result in a new position 204-1 of the first/top rotor coil 204 and/or, as shown in FIG. 2D, by a new position 206-1 of the second/bottom rotor coil 206. It is to be appreciated, that the absolute value of the delta angle $\Delta\Theta$ will be zero when measurable torque is not applied to an axle and will be non-zero when measurable torque is applied to the axle. As shown in FIG. 2E, when measurable torque is applied to an axle, the delta angle $\Delta\Theta$ represents the differences between the angular rotations, $\Theta_{RT}$ as compared to $\Theta_{RB}$, reflect the torque applied to the axle. When measurable torque is applied to the axle, the delta angle $\Delta\Theta$, representing the difference between the angular rotation $\Theta_{RT}$ of the first/top rotor coil 204 versus the angular rotation $\Theta_{RB}$ of the second/bottom rotor coil 206, can be measured using the transfer functions and equations discussed below. Such differences arise regardless of rotation of the axle and/or of the RPM's exerted on the axle and do not require determinations of angular positional differences of the rotors, as per the prior art.

It is further to be appreciated that the various embodiments of the present disclosure can be used to detect various operating states of an axle, such as: (a) static, no torque—when $\Theta_{RT} = \Theta_{RB} \neq$ zero; (b) static, under torque—when one of $\Theta_{RT}$ and $\Theta_{RB}$ is zero and the other of $\Theta_{RT}$ and $\Theta_{RB}$ is non-zero; (c) spinning under torque—when each of $\Theta_{RT}$ and $\Theta_{RB}$ are non-zero; and (d) free-spinning—when $|\Theta_{RT}| = |\Theta_{RB}| >$ zero.

A PCB or similar material may be used for a rotor 106/108. For at least one embodiment, the rotor coils 204/206 have symmetrical patterns arising on one layer. The rotor pattern may be the same as is used for a receive coil on a stator, as discussed below. For at least one embodiment, symmetry arises over any 90-degree rotation of a rotor.

Figure 3A:
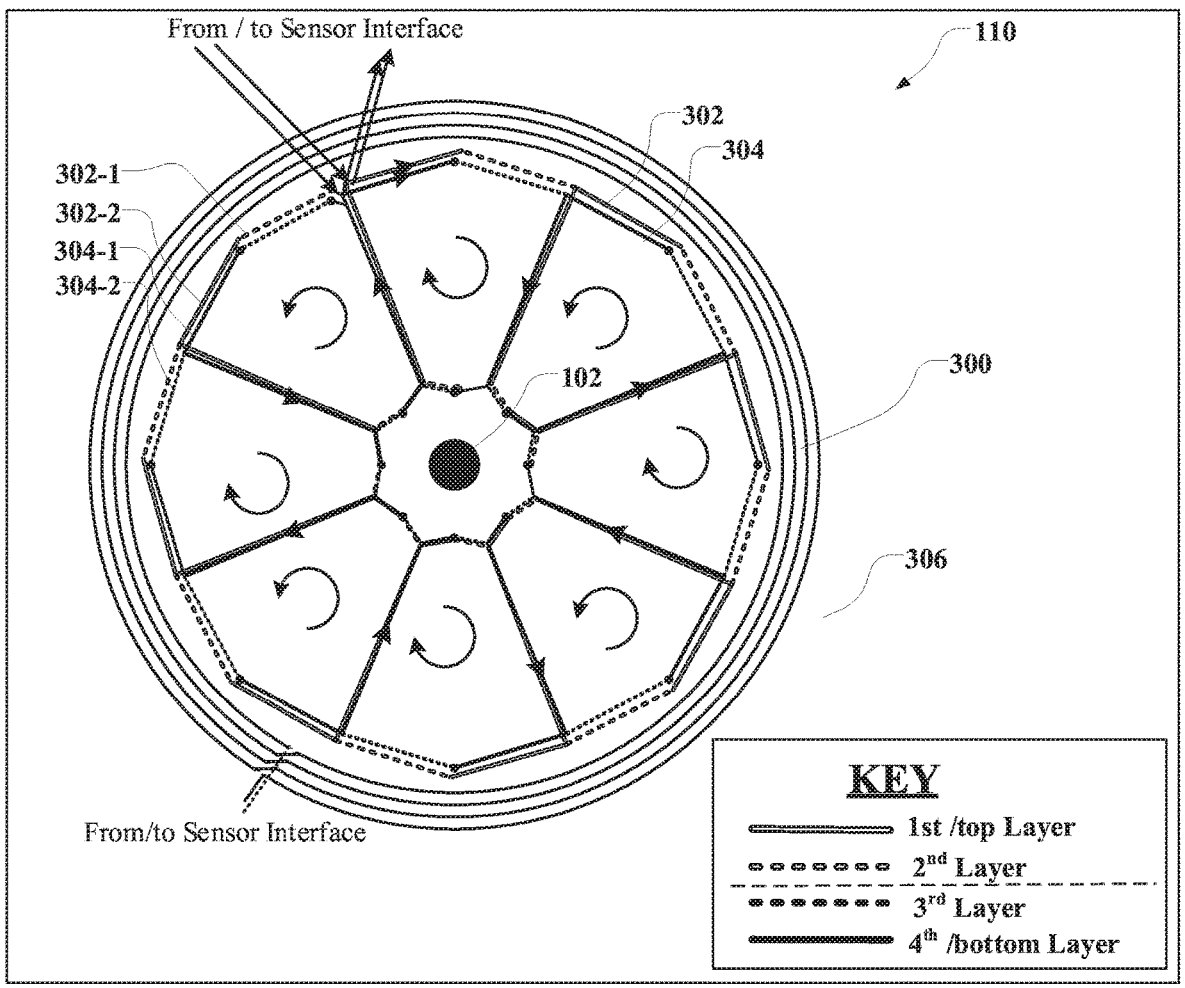
FIG. 3A is a schematic representation of a stator for use in accordance with at least one embodiment of the present disclosure.
Figure 3B:
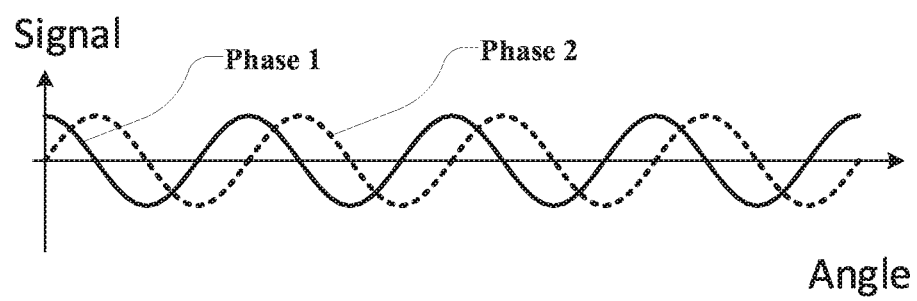
FIG. 3B illustrates the response of a two-phase receiver in accordance with at least one embodiment of the present disclosure.
Figure 3C:
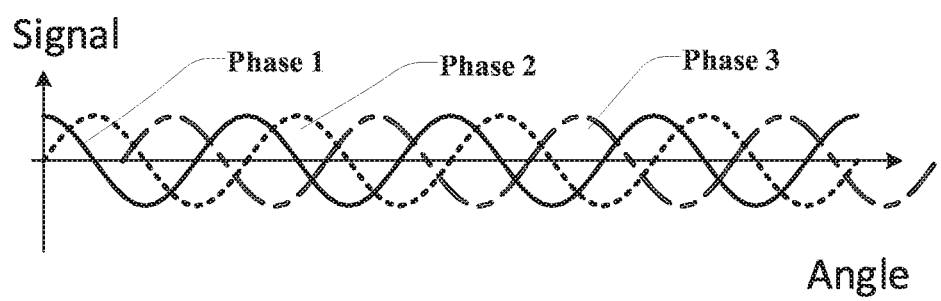
FIG. 3C illustrates the response of a three-phase receiver in accordance with at least one embodiment of the present disclosure.
Figures 3D, 3E:
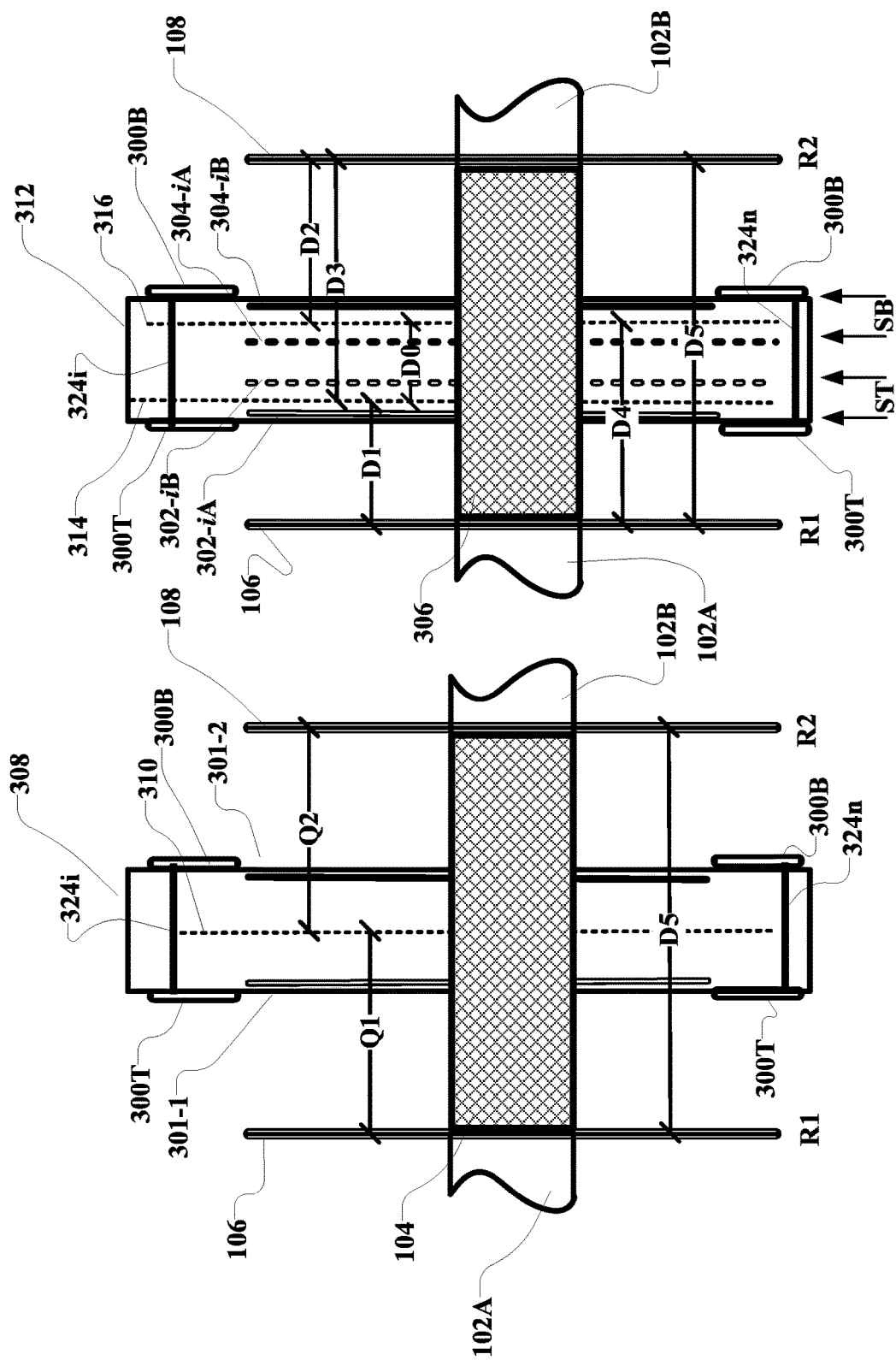
FIG. 3D illustrates a prior art embodiment of a single receiver torque sensor.
FIG. 3E illustrates a two-receiver torque sensor in accordance with at least one embodiment of the present disclosure.

As shown in FIGS. 3A-3J and for at least one embodiment, a stator 110 may include three elements: a first/top receiver ("ST"), a second/bottom receiver ("SB"), and an excitation element 300. The excitation element 300 may include a coil laid out in a rotational symmetry having one or more turns. For at least one embodiment, the excitation element 300 is drawn on a PCB 306 as a multi-turn single loop coil. The excitation element 300 may be formed on both a top layer and a bottom layer of the PCB 306 to induce currents in both the first and second receivers. The excitation element 300 may be laid out on a PCB 306 around the first/top receiver ST having one or more top receiver coils 302, for example, first coil 302-1 and second coil 302-2, and the second/bottom receiver SB having one or more bottom receiver coils 304, for example, third coil 304-1 and fourth coil 304-2. As shown in FIGS. 3D and 3E, one or more third vias 324i-n connect the top excitation coil 300T with the bottom excitation coil 300B. For at least one embodiment, the same or a different PCB may be used to provide an excitation coil, such as coil 300 shown in FIG. 3A. The excitation coil 300 generates electromagnetic fields when current is forced through the excitation coil.

For at least one embodiment, each receiver may include coils having a twisted loop design and with alternating clockwise and counter-clockwise patterns. The loops may be connected via multiple vias such as first vias 320 for use with the top receiver coil(s) 302, and second vias 322 for use with the bottom receiver coil(s) 304. For at least one embodiment, the number of clockwise and counter-clockwise loops may be provided in symmetrical patterns, such as four clockwise loops and four counter-clockwise loops with each loop having 90-degree symmetry, as shown in FIGS. 3I and 3J. Other coil designs may be used for other embodiments.

As shown in FIG. 3E, the first/top receiver's coils 302-iA, 302-iB may be drawn on different layers of a multi-layer PCB 312, such as on a first/top layer and a second layer. The second receiver's SB coils may likewise use a third layer and a fourth/bottom layer of the PCB onto which the second receiver's coils 304-iA, 304-iB are drawn. For at least one embodiment, the second receiver's coils are drawn to be non-planar with the first receiver's coils. For at least one embodiment, the first receiver's coils and the second receiver's coils overlap. It is to be appreciated that overlapping coils can improve calibration efficiency and accuracy.

Each receiver may include multiple coils configured into multi-phase configurations, with each phase being drawn as a separate coil through the PCB. For at least one embodiment, a two-phase configuration is used, where the coil for each phase is shifted by 90 degrees from the other phase. For another embodiment, a three-phase configuration is used, where the coil for each phase is shifted by 120-degrees from the other phases.

Figure 5:
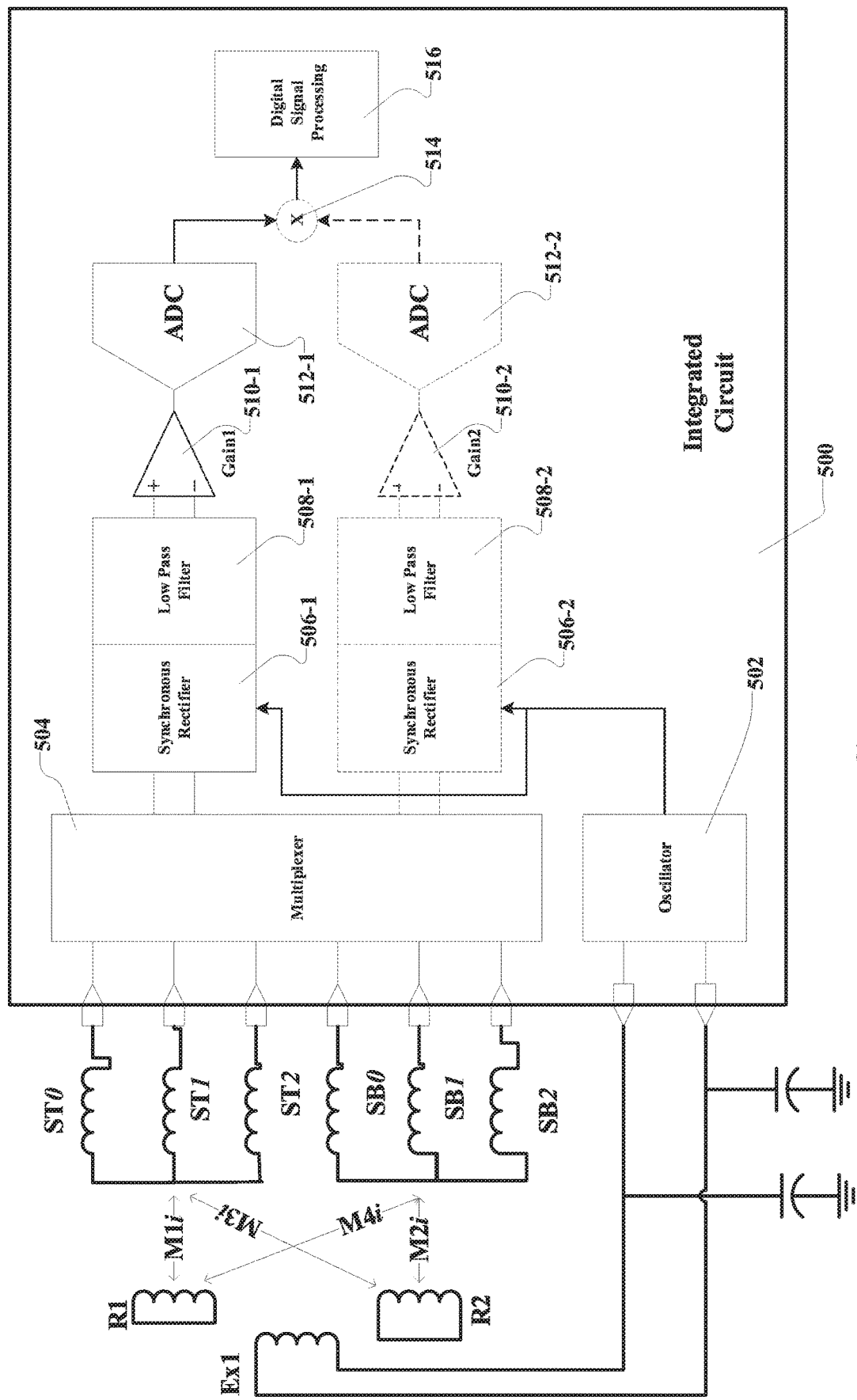
FIG. 5 is a schematic representation of an integrated circuit configured for use in accordance with at least one embodiment of the present disclosure.

As shown in FIG. 5 and discussed further below, circuitry may be provided connecting each receiver coil and the excitation coil with an integrated circuit providing signal processing capabilities and logic, as further described below for at least one embodiment.

As shown in FIG. 3B, the inductive response of a two-phase receiver is shown. For such an embodiment, as the rotor mechanically turns 90 degrees, a 360-degree turn is induced electrically in the receive coils. This mutual inductance arises due to the rotational symmetry of the rotor and stator.

As shown in FIG. 3C, the inductive response of a three-phase receiver is shown, where each coil is offset by 120 degrees from the other coils. For such an embodiment, as the rotor mechanically turns 90 degrees, a 360-degree turn is induced electrically. It is to be appreciated, as the number of phased coils increases, greater sensitivity in mechanical rotations of a rotor can be measured by a given receiver. Likewise, it is to be appreciated that higher rotational symmetry decreases the sensitivity of the sensing assembly to misalignments of rotor coils and stator coils during manufacturing and use thereafter. It is also to be appreciated that a three-phase coil design provides a degree of built-in redundancy as the sum of the three amplitudes is always zero. This characteristic can also be used during device initialization and/or calibration to address any manufacturing defects during stator construction.

In FIG. 3D, a representation of one embodiment of a prior art dual layer (top and bottom) stator 308 is shown. The stator 308 includes a single receiver coil 301 having two layers, such as the top layer 301-1 and a bottom layer 301-2. The top layer 301-1 and the bottom layer 301-2 result in a dual layer average stator 310 that is a distance Q1 from the first rotor R1 and a distance Q2 from the second rotor R2. It is to be appreciated, however, that the distances Q1 and Q2 depend on respective air gaps that exist between the two rotors. The width of these combined air gaps D5 will often vary due to longitudinal movements of the axle and/or the torsion bar during use of the target. Accordingly, use of an embodiment as shown in FIG. 3D will often require more frequent re-calibrations than may be desired and will often induce errors in measured torques.

In FIG. 3E and in accordance with at least one embodiment of the present disclosure, a representation of a quad-layer stator 312 includes a first/top receiver ST and a second/bottom receiver SB. Each receiver ST/SB includes at least one coil having two layers, such as the $1^{st}$/top layer 302-$i$A and $2^{nd}$ layer 302-$i$B for the first receiver ST and a $3^{rd}$ layer 304-$i$A and a $4^{th}$/bottom layer 304-$i$B for the second receiver SB, where "i" indicates the phase of the receiver. As was the case for the dual layer stator 308, for the quad-layer stator 312, the first layer 302-$i$A and the second layer 302-$i$B are drawn such that a first resulting average stator 314 is a first distance D1 from the first rotor R1. Likewise, the third layer 304-$i$A and the fourth/bottom layer 304-$i$B are drawn such that a second resulting average stator 316 is a second distance D2 from the second rotor R2. Further, a constant distance D0 may be determined based on known and/or measured properties of the stator 312 during manufacturing and/or initial testing. This constant distance D0 represents the distance between the first and second resulting average stators 314/316. For at least one embodiment, D0 equals approximately ⅔rds of the thickness of the quad layer stator 312. As discussed further below, distance D0 facilitates elimination of variances, if any, arising during operation of a target due to variances in the air gap D5 difference. It is to be appreciated, however, that just as the distances Q1 and Q2 may vary depend due to variances in the air gap that exists between the two rotors, distances D1 and D2 may also vary. Likewise, the distance D3 between the first resulting average stator 314 to the second rotor 108 and the distance D4 between the second resulting average stator 316 and the first rotor 106 may also vary. Such variances are negated by use of the D0 value, as discussed below.

Figure 3F:
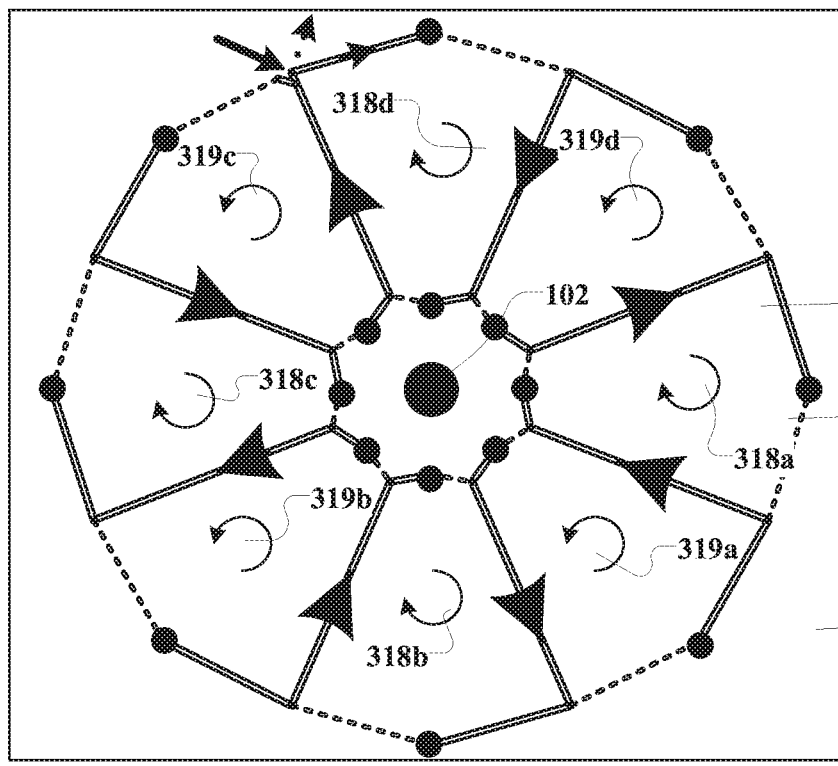
FIG. 3F illustrates the electromagnetic fields induced in a coil for a top receiver in accordance with at least one embodiment of the present disclosure.
Figure 3G:
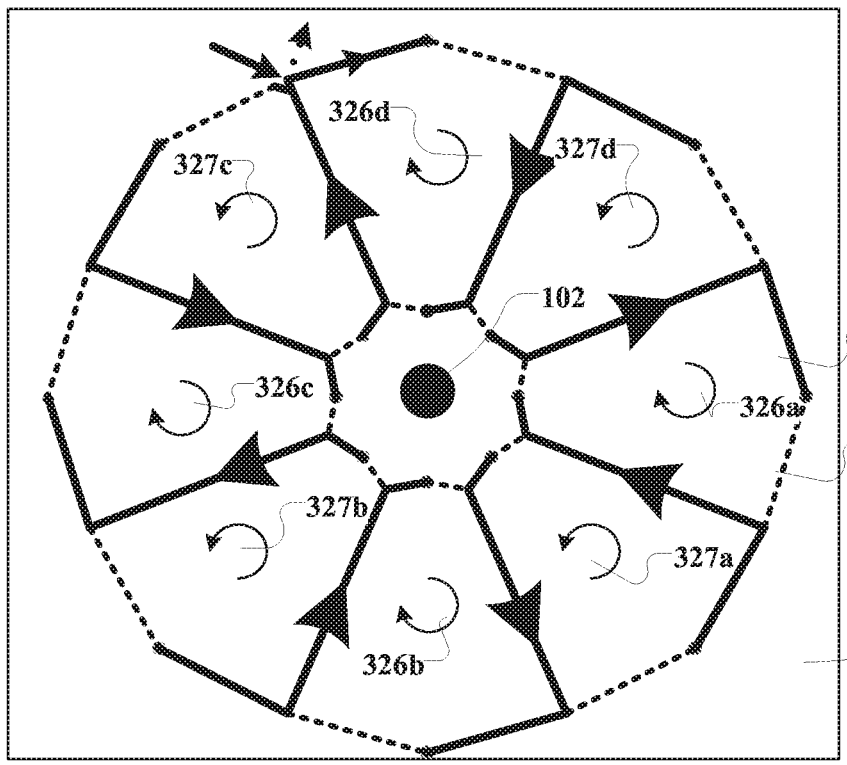
FIG. 3G illustrates the electromagnetic fields induced in a coil for a bottom receiver in accordance with at least one embodiment of the present disclosure.
Figure 3H:
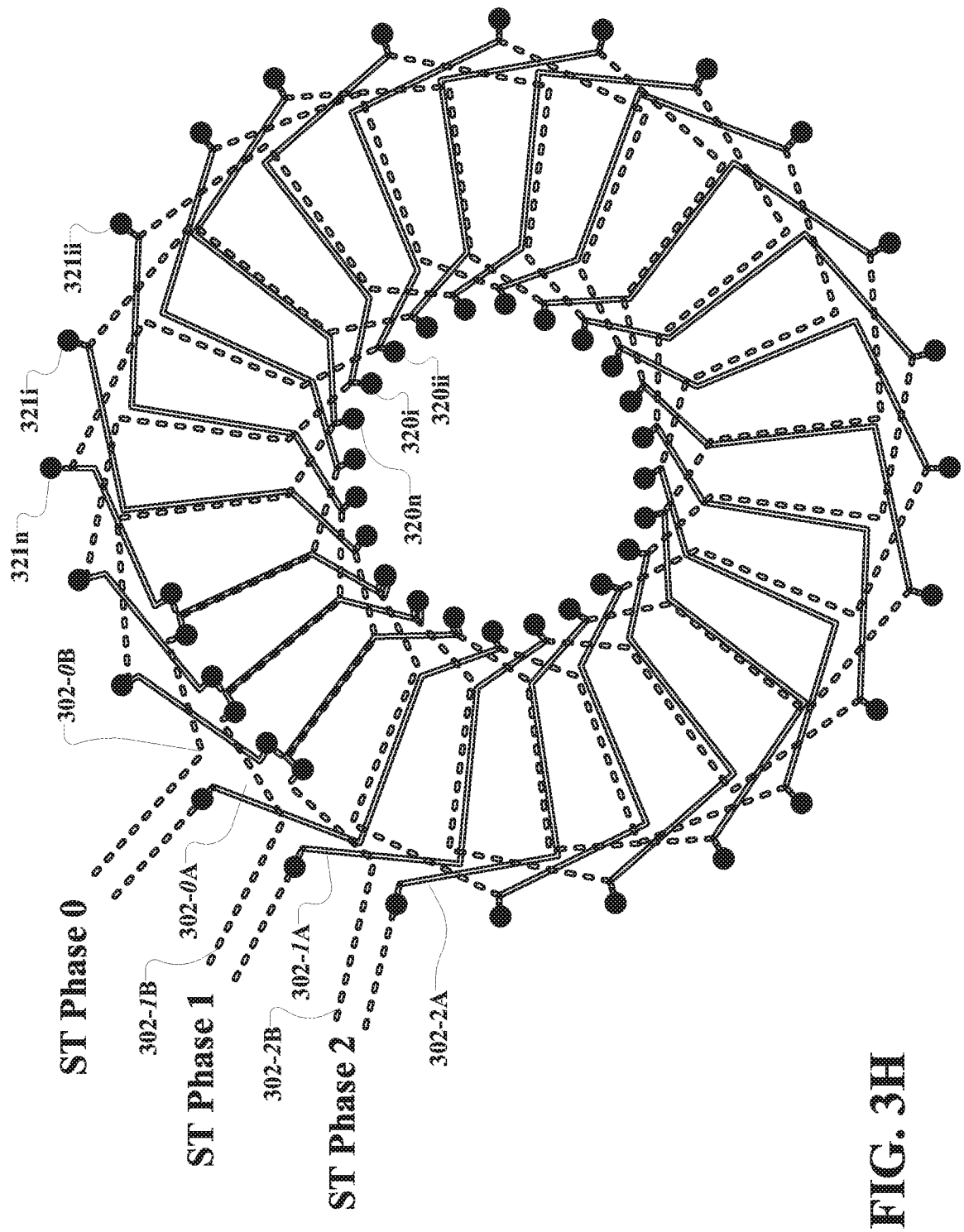
FIG. 3H illustrates coils and loops used in a three-phase first/top receiver in accordance with at least one embodiment of the present disclosure.
Figure 3I:
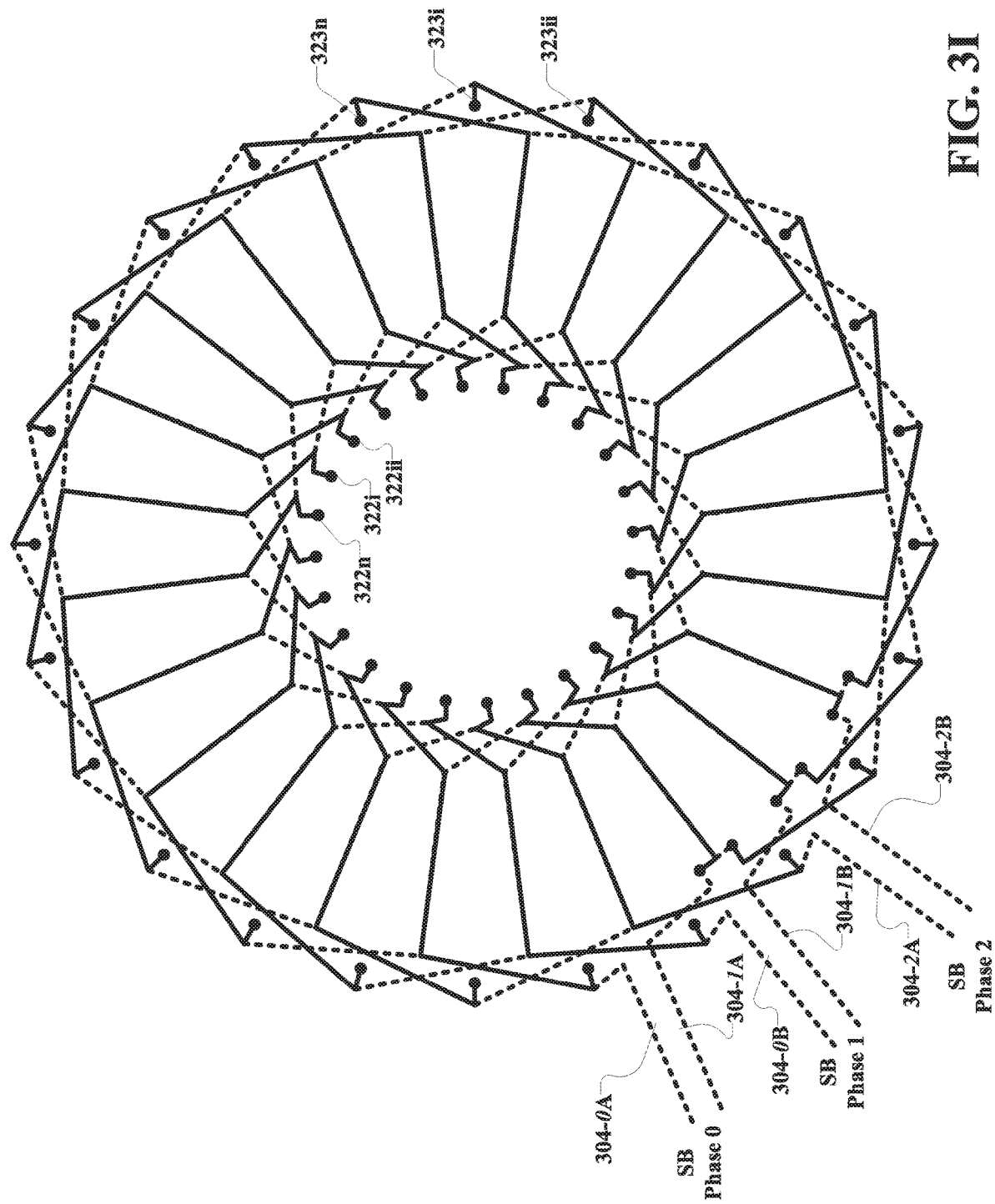
FIG. 3I illustrates coils used in a three-phase second/bottom receiver in accordance with at least one embodiment of the present disclosure.
Figure 3J:
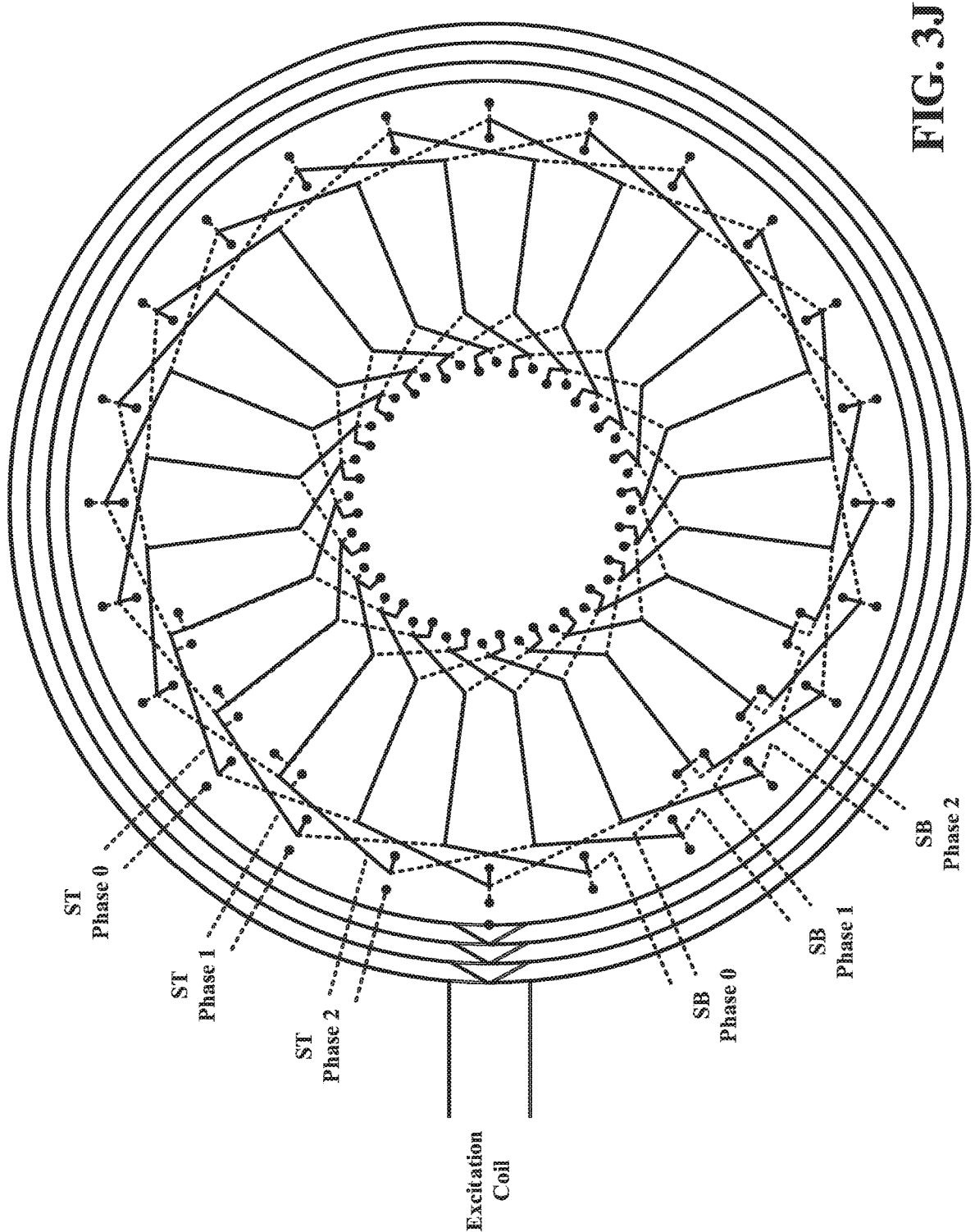
FIG. 3J illustrates coils used in three-phase first/top receiver and in a three-phase second/bottom receiver in accordance with at least one embodiment of the present disclosure.

As further shown in FIGS. 3F-3I, and as discussed above with reference to FIGS. 3B and 3C, each receiver may be drawn to include at least two or three phased coils 302-$i$A/B and 304-$i$A/B. In FIGS. 3F and 3H a representation of a single receiver coil, such as the top receiver coil 302 is shown. As shown, each receiver ST/SB may include two or more phased coils, such as the three top coils shown, namely ST0, ST1 and ST2. Each coil includes loops 302-$i$A/B that are joined by first vias 320$i$-$n$ and 321$i$-$n$, respectively.

In FIGS. 3G and 3I, the bottom receiver coil 304 SB is additionally shown and may also include multiple coils, such as coils SB1, SB2 and SB3. Each coil includes loops 304-$i$A/B that are joined by second vias 322$i$-$n$ and 323$i$-$n$.

It is to be appreciated that two or more coils may be used for a receiver in accordance with an embodiment of the present disclosure. Further, it is to be appreciated that the drawing of the coils onto a PCB or other substrate may occur using any known processes. Such drawing may include the drawing of any or all coils at any given process step and the present disclosure is not to be considered as being limited to a sequential drawing of coils or otherwise. The coils may be drawn, deposited, or otherwise formed in a PCB or other substrate using any known or desired compounds, such as copper, aluminum, gold, or others. In accordance with at least one embodiment, each of coils for the first and second receivers and excitation elements are drawn on the same multi-layer PCB.

As discussed above, each of the receivers may include two or more phase coils. For a three-phase configuration, each of the coils is commonly turned by 120 degrees relative to an immediately preceding coil. However, other offsets may be used for other embodiments, with accordingly and computable changes in the transfer functions by a person having ordinary skill in the art.

As shown in FIGS. 3F and 3G, respective top and bottom views of a single phase for each of the first receiver ST and the second receive coil SB are shown, where each of the coils for such phase are drawn onto a multi-layer stator such as the quad layer stator 312. For at least one embodiment, the receive coils may be respectively offset by 90 degrees electrically or 22.5 degrees mechanically from each other for a two-phase embodiment. For at least one embodiment, the receive coils may be respectively offset to mirror the symmetry utilized for a given rotor. As shown, clockwise electromagnetic fields 318$a$-$d$, 326$a$-$d$ and counter-clockwise electromagnetic fields 319$a$-$d$, 327$a$-$d$ are induced in the coils. For at least one embodiment, the receive coils are not offset and are substantially aligned with each other. For at least one embodiment, the receive coils are symmetrical. It is to be appreciated, that the various embodiments of the present disclosure facilitate the determining of the torque on an axle based upon angular differences and not based upon angular positions themselves. Accordingly, the orientation of the first receiver's coils to the second receiver's coils may be at any desired orientation. Inductive properties of such a configuration may be measured and used to calibrate the torque sensing assembly during initialization and calibration operations.

As shown in FIG. 3H, coils for a three-phase top receiver ST is shown. The top receiver ST includes coils 302-$i$A/B for an initial phase (ST Phase 0), a first phase (ST Phase 1), and a second phase (ST Phase 2).

As shown in FIG. 3I, coils for a three-phase bottom receiver SB is shown. The bottom receiver SB includes coils 304-$i$A/B for an initial phase (SB Phase 0), a first phase (SB Phase 1), and a second phase (SB Phase 2).

As shown in FIG. 3J and for at least one embodiment of the present disclosure, a stator having a top receiver ST with three phased coils and a bottom receiver SB with three phased coils, as well as an excitation coil is shown.

Figure 4:
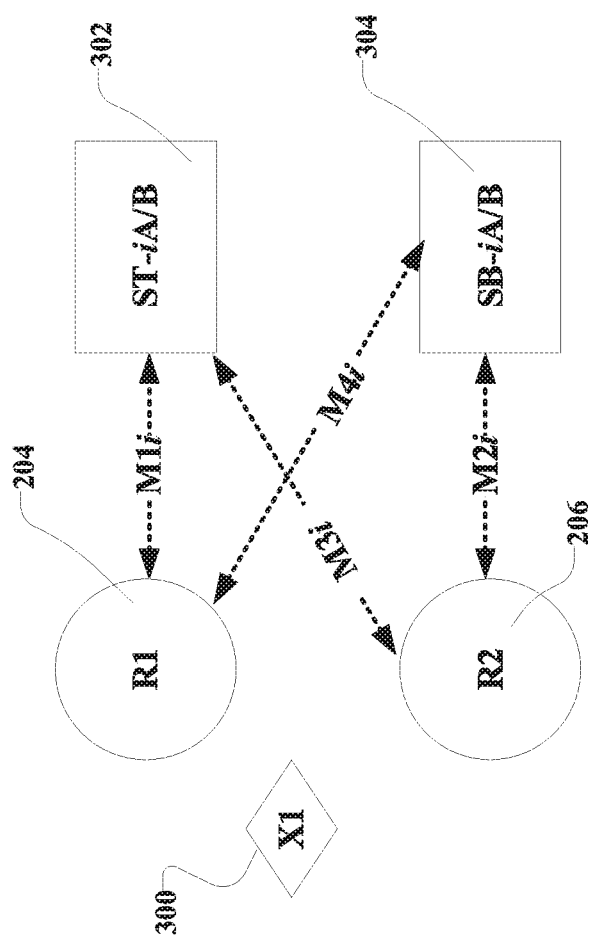
FIG. 4 illustrates the mutual inductances generated in the first/top and second/bottom stator receiver coils by the excitation coil and as influenced by the first/top and second/bottom rotors in accordance with at least one embodiment of the present disclosure.

It is to be appreciated that by use of the excitation stator 300, the two rotor coils 204, 206, and the two-receiver stator ST/SB configurations described above for at least one embodiment, mutual inductances are generated between the respective excitation coils and receivers for each of the phases. Such inductances are influenced by the rotor coils 204, 206. These mutual inductances are shown in FIG. 4 and can be represented by the symbols Mn$i$ (where, n is an integer used for numbering purposes only, i indicates the phase) specifically, the inductances generated are identified in Table 1:

TABLE 1

| Receiver | Coil Phase "i" | Mutual Inductance Rotor 1 | Mutual Inductance Rotor 2 |
|---|---|---|---|
| Top | 0 | M1$i$ = $f$(D1) | M3$i$ = $f$(D0 + D2) |
| | 1 | M1$i$ = $f$(D1) | M3$i$ = $f$(D0 + D2) |
| | 2 | M1$i$ = $f$(D1) | M3$i$ = $f$(D0 + D2) |
| Bottom | 0 | M4$i$ = $f$(D0 + D1) | M2$i$ = $f$(D2) |
| | 1 | M4$i$ = $f$(D0 + D1) | M2$i$ = $f$(D2) |
| | 2 | M4$i$ = $f$(D0 + D1) | M2$i$ = $f$(D2) |

It is to be appreciated that each Mn$i$ can be positive or negative, the inductances respectively generated over distance D3, D4 are smaller than the inductance generated over distances D2, D1. Further, the receive coils and rotor coils may be configured such that the inductance generated in the former by the latter are reflective of the distances D0, D1 and D2 (where D3=D0+D2, and D4=D0+D1) between a given receive coil and a given rotor. That is, for at least one embodiment, M1$i$=$f$(D1), M2$i$=$f$(D2), M3$i$=$f$(D3) and M4$i$=$f$(D4).

As shown in FIG. 5, the excitation coil 300 and receive coils may be coupled to an integrated circuit 500 configured to drive a current through the excitation coils and generate the electromagnetic field emitted by the excitation coils "Ex1" and detected by the phased loop coils of the first/top and second/bottom receivers ST/SB and as influenced by the mutual inductances M1$i$-M4$i$ generated by the rotational positions of the first and second rotor coils 204, 206, such rotational positions generated by the torque on the axle. The integrated circuit 500 may include an alternating current source, such as an oscillator 502 which provides an alternating current to the excitation coil Ex1. In at least one embodiment, the oscillator 502 may be provided independent or integrated with the integrated circuit 500. A multiplexer 504 may also be provided in or used in conjunction with the integrated circuit 500. The multiplexer 504 may be configured to sequentially switch between the coils to measure differences between the received signals. For at least one embodiment, the integrated circuit 500 may be configured to parallel process or sequentially process the signals induced in each of the phased coils of the first and second receivers ST/SB. As shown, such processing may include synchronous rectification of the received signal by one or more rectifiers 506-1, 506-2, filtering by filters 508-1, 508-2, amplification by amplifiers 510-1, 510-2, analog to digital ("A/D") conversion by A/D converters 512-1, 512-2, mixing by mixer 514, and digital signal processing by a digital signal processor ("DSP") 516.

For at least one embodiment, the integrated circuit 500 is configured to detect changes in the amplitude of a voltage potential induced in the respective receivers ST/SB based on the angular changes of the first/top and second/bottom rotor coils 204/206. Based on the amplitudes detected and changes therein, the relative angular changes (the rotation) of the first rotor coil 204 versus the second rotor coil 206 can be determined based on the transfer functions corresponding to the mutual inductances M1$i$-, M2$i$, M3$i$ and M4$i$ generated.

More specifically, for at least one embodiment, the first/top received signal ST$i$ induced in the first receiver and the second/bottom received signal SB$i$ induced in the second receiver, by the excitation coils and as influenced by the positions of the two rotor coils 204/206, can be respectively expressed mathematically as per Equations 2 and 3.

$$ST i = A_1 * \sin(\Theta_{RT} + i*\delta) - A_0 * A_2 * \sin(\Theta_{RB} + i*\delta) \qquad \text{Equation 2}$$

$$SB i = A0 * A_1 * \sin(\Theta_{RT} + i*\delta) - A_2 * \sin(\Theta_{RB} + i*\delta) \qquad \text{Equation 3}$$

where for each of Equations 2 and 3:
ST=designates the first receiver;
SB=designates the second receiver;
A1=first coupling attenuation from the first/top rotor RT to the first/top receiver ST due to distance D1;
A2=second coupling attenuation from the second/bottom rotor RB to the second/bottom receiver SB due to distance D2; and
A0=known coupling attenuation due to distance D0.
For a two-phase system: i=0, 1 and δ=90;
For a three-phase system: i=0, 1, 2 and δ=120.

Further, it is to be appreciated that the first and second coupling attenuations A1, A2 are commonly unknown and arise due to the variations in the air gaps D1, D2, as discussed above. The minus sign in Equation 3 indicates that the two rotors are shifted 180 degrees electrically.

In view of Equations 2 and 3 and for a full cycling of the integrated circuit through each of the desired phases, it is to be appreciated that either four equations (for two phase system) or six equations (for three phase system), equations with four unknowns can be generated. These equations result in a determination of the delta angle ΔΘ by the digital signal processor based on the calculated measurements of the four or six receive coils. It is to be appreciated that at low RPMs, the processing speed of the digital signal processor and the integrated circuit does not need to be relatively fast. For high RPMs, any mismatch that may arise in measurement delays may be addressed by measuring the amplitude of the received signals over any number of electrical turns. Given that the electrical turns occur at a much higher rate than the torque variations, sufficient processing time should be available to overcome any errors that may otherwise arise.

For at least one embodiment, the digital signal processor may be configured as a finite state machine configured to perform one or more of the equations set forth herein. In another embodiment, the digital signal processor may be configured as a micro-processor configured to execute non-transient computer executable, instructions that are suitably stored on firmware, software, or otherwise for use in performing one or more of the equations set forth herein. In other embodiments, combinations of discrete, analog, microprocessor or other components may be used. Regardless of how configured, the digital signal processor is configured to calculate the torque generated over a given period based on Equation 1, where as described above: $\tau = K*\Delta\Theta$, where $\Delta\Theta$ can be determined for both a two-phase system per Equation 4, and for a three phase system per Equation 5, as the arc tangent of a function of the sine over cosine differences between the angular changes for the first rotor $\Theta_{R1}$ and for the second rotor $\Theta_{R2}$, where W, X, Y and Z are defined as per Table 2 below:

$$\tau = K*\tan^{-1}\left(\frac{[(1-A_0^2)Z]}{A_0(W+X)-(1+A_0^2)Y}\right) = \quad \text{Equation 4}$$

$$K*\tan^{-1}\left(\frac{\sin(\Theta_{RT}-\Theta_{RB})}{\cos(\Theta_{RT}-\Theta_{RB})}\right)$$

$$\tau = K*\tan^{-1}\left(\frac{\sqrt{3}*[(1-A_0^2)Z]}{A_0(W+X)-(1+A_0^2)Y}\right) = \quad \text{Equation 5}$$

$$K*\tan^{-1}\left(\frac{\sin(\Theta_{RT}-\Theta_{RB})}{\cos(\Theta_{RT}-\Theta_{RB})}\right)$$

TABLE 2

| 2 Phase System (low RPM) | 3 Phase System (low speed) | 2 or 3 Phase System (high RPM) (where i = 0,1 or 0, 1, 2) |
|---|---|---|
| W = ST0² + ST1² | W = ST0² + ST1² + ST2² | W = 3*avg.(STi²) |
| X = SB0² + SB1² | X = SB0² + SB1² + SB2² | X = 3*avg.(SBi²) |
| Y = ST0*SB0 + ST1*SB1 | Y = ST0*SB0 + ST1*SB1 + ST2*SB2 | Y = 3*avg.(STi*SBi) |
| Z = ST0*SB1 − ST1*SB0 | Z = ST0*SB2 − ST2*SB0 or Z = ST1*SB0 − ST0*SB1 or Z = ST2*SB1 − ST1*SB2 | for 2 phase systems Z = avg.(ST0*SB1) − avg.(ST1*SB0) for 3 phase systems Z = avg.(ST0*SB1) − avg.(ST2*SB0) or Z = avg.(ST1*SB0) − avg.(ST0*SB1) or Z = avg.(ST2*SB1) − avg.(ST1*SB2) |

A person of ordinary skill in the art will appreciate that the above equations, in view of the sensor transfer functions of Equations 2 and 3 can yield for example, for the two-phase system:

$$W = A_1^2 + A_0^2 * A_2^2 - 2 * A_0 * A_1 * A_2 * \cos(\Theta_{RT} - \Theta_{RB})$$

$$X = A_0^2 * A_1^2 + A_2^2 - 2 * A_0 * A_1 * A_2 * \cos(\Theta_{RT} - \Theta_{RB})$$

$$Y = A_0(A_1^2 + A_2^2) - (1 + A_0^2) * A_1 * A_2 * \cos(\Theta_{RT} - \Theta_{RB})$$

$$Z = (1 - A_0^2) * A_1 * A_2 * \cos(\Theta_{RT} - \Theta_{RB}))$$

and for the three-phase system:

$$W = \frac{3}{2}(A_1^2 + A_0^2 * A_2^2 - 2 * A_0 * A_1 * A_2 * \cos(\Theta_{RT} - \Theta_{RB}))$$

$$X = \frac{3}{2}(A_1^2 + A_0^2 * A_2^2 - 2 * A_0 * A_1 * A_2 * \cos(\Theta_{RT} - \Theta_{RB}))$$

$$Y = \frac{3}{2}(A_0(A_1^2 + A_2^2) - (1 + A_0^2) * A_1 * A_2 * \cos(\Theta_{RT} - \Theta_{RB}))$$

$$Z = \frac{\sqrt{3}}{2}((1 - A_0^2) * A_1 * A_2 * \cos(\Theta_{RT} - \Theta_{RB}))$$

It is to be appreciated that the integrated circuit 500 and/or the DSP 516 are configured to execute the above described mathematical functions and determine the torque on a target based on the delta angle $\Delta\Theta$ for both low RPM and high RPM implementations. Such implementations do not require the use of ferrite or similar substances to isolate the inductive sensors.

Accordingly, various embodiments of an inductive torque sensor are described. Various embodiments may include the use of multiple receive coils drawn onto a substrate proximate to corresponding excitation coils. Further, methods of manufacturing of one or more embodiments of the inductive torque sensor may be used in accordance with known and/or future arising manufacturing principles and materials. Further, use of an inductive torque sensor according to an embodiment of the present disclosure may arise in conjunction with any known or future arising targets.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "about", "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "before", "after", and other similar terms are used for description and ease of reference purposes only and are not intended to be limiting to any orientation or configuration of any elements or sequences of operations for the various embodiments of the present disclosure. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. An inductive torque sensor, comprising:
a first rotor attached to a first member of a target;
a second rotor attached to a second member of the target;
a stator, aligned relative to the first rotor and the second rotor, comprising:
at least one magnetic field excitation element;
a first receiver comprising a first phased loop with a first geometry configured to output a first received signal (ST); and
a second receiver comprising a second phased loop with the first geometry configured to output a second received signal (SB);
a processor coupled to the stator and configured to:
receive the first received signal (ST) and the second received signal (SB); and
based on the received signals, determine a torque exerted on the target as a function of a delta angle $\Delta\Theta$.

2. The inductive torque sensor of claim 1,
wherein the target is an axle including the first member and the second member and a torsion bar separates and mechanically connects the first member with the second member.

3. The inductive torque sensor of claim 1,
wherein the delta angle ($\Delta\Theta$) is representative, at a given time, of a relative angular change between a change in rotational position of the first rotor ($\Theta_{RT}$) versus a change in rotational position of the second rotor ($\Theta_{RB}$).

4. The inductive torque sensor of claim 3,
wherein the first receiver is approximated as a first resulting average stator;
wherein the second receiver is approximated as a second resulting average stator;
wherein a known distance (D0) exists between the first resulting average stator and the second resulting average stator;
wherein a first distance (D1) arises between the first resulting average stator and the first rotor; and
wherein a second distance (D2) arises between second resulting average stator and the second rotor.

5. The inductive torque sensor of claim 4,
wherein a known coupling attenuation (A0) arises from the known distance (D0);
wherein a first coupling attenuation (A1) arises from the first distance (D1);
wherein a second coupling attenuation (A2) arises from the second distance (D2); and
wherein each of the first received signal (ST) and the second received signal (SB) are a function of each of A0, A1, A2, $\Theta_{RT}$, and $\Theta_{RB}$.

6. The inductive torque sensor of claim 5,
wherein the first receiver and the second receiver comprise coils configured for use in at least one of a two-phase configuration and a three-phase configuration;
wherein the first received signal (ST) for a given phase (i) is defined pursuant to the equation:

$$STi = A_1 * \sin(\Theta_{RT} + i*\delta) - A_0 * A_2 * \sin(\Theta_{RB} + i*\delta)$$

wherein for a two-phase first receiver configuration, i=0 or 1, and $\delta$=90; and
wherein for a three-phase first receiver configuration, i=0, 1 or 2, and $\delta$=120.

7. The inductive torque sensor of claim 6,
wherein the second received signal (SB) for a given phase (i) of the second receiver is defined pursuant to the equation:

$$SBi = A0 * A_1 * \sin(\Theta_{RT} + i*\delta) - A_2 * \sin(\Theta_{RB} + i*\delta)$$

wherein for a two-phase second receiver configuration, i=0 or 1, and $\delta$=90; and
wherein for a three-phase second receiver configuration, i=0, 1 or 2, and $\delta$=120.

8. The inductive torque sensor of claim 7,
wherein each of the first receiver and the second receiver are configured in the two-phase configuration; and
wherein the processor is configured to determine the delta angle ($\Delta\Theta$) pursuant to the equation:

$$\Delta\Theta = \tan^{-1}\left(\frac{[(1-A_0^2)Z]}{A_0(W+X)-(1+A_0^2)Y}\right)$$

wherein:
W=the sum of square of the first received signal for each phase i;
X=the sum of square of the second received signal for each phase i;
Y=the sum, for each phase i, of the first received signal multiplied by the second received signal; and
for a low revolution per minute target:

$$Z = ST0 * SB1 - ST1 * SB0$$

wherein:
ST0=the first received signal for an initial phase;
ST1=the first received signal for the first phase;
SB0=the second received signal for the initial phase; and
SB1=the second received signal for a first phase.

9. The inductive torque sensor of claim 7,
wherein each of the first receiver and the second receiver are configured in the three-phase configuration; and
wherein the processor is configured to determine the delta angle ($\Delta\Theta$) pursuant to the equation:

$$\Delta\Theta = \tan^{-1}\left(\frac{\sqrt{3}*[(1-A_0^2)Z]}{A_0(W+X)-(1+A_0^2)Y}\right)$$

wherein:
W=the sum of the square of the first received signal for each phase i;
X=the sum of square of the second received signal for each phase i;
Y=the sum, for each phase i, of the first received signal multiplied by the second received signal; and
for a low revolution per minute target:
Z equals one of:
(a) ST0*SB2−ST2*SB0;
(b) ST1*SB0−ST0*SB1; or
(c) ST2*SB1−ST1*SB2;

wherein:
ST0=the first received signal for an initial phase;
ST1=the first received signal for a first phase;
ST2=the first received signal for a second phase;
SB0=the second received signal for the initial phase;
SB1=the second received signal for the first phase; and
SB2=the second received signal for the second phase.

10. The inductive torque sensor of claim 7,
wherein each of the first receiver and the second receiver are configured in the two-phase configuration; and
wherein for a high revolution per minute target the processor is configured to determine the delta angle $\Delta\Theta$ pursuant to the equation:

$$\Delta\Theta = \tan^{-1}\left(\frac{[(1-A_0^2)Z]}{A_0(W+X)-(1+A_0^2)Y}\right)$$

wherein:
W=three times the average of the square of the first received signal over each phase i;
X=three times the average of the square of the second received signal over each phase i;
Y=three times the average of the first received signal time the second received signal over each phase i; and
Z=the average of the first received signal for the initial phase multiplied by the second received signal for the first phase minus the average of the first received signal for the first phase multiplied by the second received signal for the initial phase.

11. The inductive torque sensor of claim 1,
wherein the processor is configured to determine the torque exerted on the target for at least one of a low revolution per minute configuration and a high revolution per minute configuration.

12. A method for determining a torque exerted on a target, comprising:
receiving a first received signal;
wherein the first received signal is induced in a first receiver coil by an excitation element of a stator and influenced by the rotational positions of each of a first rotor and a second rotor;
wherein the first receiver coil comprises a first phased loop with a first geometry;
receiving a second received signal;
wherein the second received signal is induced in second receiver coil by the excitation element and influenced by the rotational positions of each of the first rotor and the second rotor;
wherein the second receiver comprises a second phased loop with the first geometry; and
determining, based on the first received signal and the second received signal, the torque as a function of a delta angle ($\Delta\Theta$) arising in view of the relative rotational positions of each of the first rotor and the second rotor.

13. The method of claim 12,
wherein the delta angle is representative, at a given time, of a relative angular change between a sensed change in a rotational position of the first rotor ($\Theta_{RT}$) versus a sensed change of rotational position of the second rotor ($\Theta_{RB}$).

14. The method of claim 12, comprising:
determining the torque exerted on the target configured in at least one of a low revolution per minute configuration and a high revolution per minute configuration.

15. The method of claim 14,
wherein the first received signal is a function of a first mutual inductance and a third mutual inductance;
wherein the first mutual inductance is a function of a first distance between the first receiver coil and the first rotor;
wherein the third mutual inductance is a function of a third distance between the first receiver coil and the second rotor;
wherein the second received signal is a function of a second mutual inductance and a fourth mutual inductance;
wherein the second mutual inductance is a function of a second distance between the second receiver coil and the second rotor; and
wherein the fourth mutual inductance is a function of a fourth distance between the second receiver coil and the first rotor.

16. The method of claim 14,
wherein each of the first receiver coil and the second receiver coil comprise a two or more phase configuration;
wherein for a two-phase configuration,
the phase (i)=0 or 1, and an offset ($\delta$)=90;
wherein for a three-phase configuration,
i=0, 1 or 2, and $\delta$=120;
wherein, for the given phase (i), the first received signal (STi) and the second received signal (SBi) are defined by:

$$STi = A_1 * \sin(\Theta_{RT} + i*\delta) - A_0 * A_2 * \sin(\Theta_{RB} + i*\delta)$$

and $$SBi = A0 * A_1 * \sin(\Theta_{RT} + i*\delta) - A_2 * \sin(\Theta_{RB} + i*\delta).$$

17. A stator for use in an inductive torque sensor, comprising:
at least one excitation coil;
a first receiver; and
a second receiver;
wherein the first receiver includes at least two coils drawn as phased loops on a first layer and a second layer;
wherein the phased loops on the first layer and the second layer form a first resulting average receiving stator;
wherein the second receiver includes at least two coils drawn as phased loops on a third layer and a fourth layer;
wherein the phased loops of the third layer and the fourth layer form a second resulting average receiving stator;
wherein the first resulting average receiving stator is a fixed distance DO from the second resulting average receiving stator.

18. The stator of claim 17,
wherein each of the first layer, second layer, third layer and fourth layer are formed on a multi-layer PCB.

19. The stator of claim 17,
wherein the first received signal (ST) for a given phase (i) of the first receiver is defined by:

$$STi = A_1 * \sin(\Theta_{RT} + i*\delta) - A_0 * A_2 * \sin(\Theta_{RB} + i*\delta)$$

wherein $\Theta_{RT}$ represents an angular change in the first rotor;

wherein $\Theta_{RB}$ represents an angular change in the second rotor;

wherein for a two-phase first receiver configuration, i=0 or 1, and δ=90;

wherein for a three-phase first receiver configuration, i=0, 1 or 2, and δ=120;

wherein the second received signal (SB) for the given phase (i) of the second receiver is defined by:

$$SBi = A0 * A_1 * \sin(\Theta_{RT} + i*\delta) - A_2 * \sin(\Theta_{RB} + i*\delta).$$

wherein for the two-phase second receiver configuration, i=0 or 1, and δ=90; and wherein for the three-phase second receiver configuration, i=0, 1 or 2, and δ=120.

20. The stator of claim 19, wherein the inductive torque sensor determines a torque exerted on a target based on a known torque constant K and a delta angle (ΔΘ); and wherein:

$$\Delta\Theta = \tan^{-1}\left(\frac{\sin(\Theta_{RT} - \Theta_{RB})}{\cos(\Theta_{RT} - \Theta_{RB})}\right).$$

\* \* \* \* \*